(12) United States Patent
Patterson et al.

(10) Patent No.: US 11,044,148 B2
(45) Date of Patent: Jun. 22, 2021

(54) OPTIMISTIC AND FAILSAFE NETWORK CONFIGURATION

(71) Applicant: NetApp, Inc., Sunnyvale, CA (US)

(72) Inventors: John Allen Patterson, Niwot, CO (US); John Mears, Arvada, CO (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 16/402,077

(22) Filed: May 2, 2019

(65) Prior Publication Data

US 2020/0351157 A1 Nov. 5, 2020

(51) Int. Cl.
*H04L 12/24* (2006.01)
*H04L 29/08* (2006.01)

(52) U.S. Cl.
CPC ...... *H04L 41/0806* (2013.01); *H04L 41/0672* (2013.01); *H04L 41/0853* (2013.01); *H04L 41/0869* (2013.01); *H04L 67/142* (2013.01)

(58) Field of Classification Search
CPC ....... G06F 13/00; G06F 15/177; H04L 12/12; H04L 12/24; H04L 29/06; H04L 29/08072; H04L 29/08981; H04L 41/12; H04L 41/22; H04L 41/0213; H04L 41/0806; H04L 41/0826; H04L 41/0866; H04L 41/0883; H04L 41/0886; H04L 29/08; H04L 41/0672; H04L 41/0853; H04L 41/0869; H04L 67/00; H04L 67/142; Y02B 60/34; Y02D 50/40
USPC .................................................. 709/220, 223
See application file for complete search history.

(56) References Cited

U.S. PATENT DOCUMENTS

| | | |
|---|---|---|
| 7,293,080 B1 | 11/2007 | Clemm et al. |
| 7,349,961 B2 | 3/2008 | Yamamoto |
| 7,626,944 B1* | 12/2009 | Riddle ................ H04L 41/0806 370/254 |
| 9,992,064 B1 | 6/2018 | Chawla et al. |
| 2009/0304381 A1 | 12/2009 | Muppidi et al. |

(Continued)

OTHER PUBLICATIONS

PCT Notification of Transmittal of the International Search Report and the Written Opinion of the International Searching Authority, or the Declaration, International Searching Authority, International Application No. PCT/US2020/030959, dated Jul. 16, 2020, 17 pages.

*Primary Examiner* — Robert B Harrell
(74) *Attorney, Agent, or Firm* — Jaffery Watson Mendonsa & Hamilton LLP (57) ABSTRACT

An optimistic and failsafe technique validates network configurations of storage and compute nodes deployed as a cluster. An optimistic aspect of the technique, saves an initial network configuration state of each node as a "failsafe" state and an expected network end-state is applied to each node. According to a validation aspect of the technique, each node employs a test to validate connectivity with other nodes in the cluster. In response to every validating node responding to a coordinating node that the validation test succeeded, an "all-clear" message is sent to all of the nodes instructing each node to maintain the applied expected network end-state. If any node is unreachable due to a configuration validation failure, then a failsafe aspect of the technique is invoked wherein the all-clear message is not sent and the remaining nodes of the cluster automatically "roll-back" to the initial failsafe network state after a timeout.

18 Claims, 4 Drawing Sheets

(56) References Cited

U.S. PATENT DOCUMENTS

| | | |
|---|---|---|
| 2013/0339494 A1 | 12/2013 | Mithyantha |
| 2015/0012623 A1* | 1/2015 | Jubran ................ H04L 41/0856 709/220 |
| 2015/0280988 A1* | 10/2015 | Vorst ...................... H04L 12/12 709/220 |
| 2016/0105320 A1* | 4/2016 | Osterberg ........... H04L 41/0853 709/208 |
| 2017/0147928 A1 | 5/2017 | Vijayendra et al. |
| 2017/0371679 A1* | 12/2017 | Chandrasekhar ..... G06F 3/0604 |
| 2017/0371680 A1* | 12/2017 | Chandrasekhar ....... G06F 9/441 |
| 2018/0136942 A1* | 5/2018 | Chandrasekhar ....... G06F 9/441 |
| 2018/0157497 A1* | 6/2018 | Chandrasekhar ..... G06F 9/4406 |

\* cited by examiner

OPTIMISTIC AND FAILSAFE NETWORK CONFIGURATION

BACKGROUND

Technical Field

The present disclosure relates to storage and compute nodes of a cluster and, more specifically, to optimistic and failsafe network configuration of the storage and compute nodes of the cluster.

Background Information

A plurality of storage and compute nodes may be organized as a cluster to provide a distributed storage architecture configured to service storage requests issued by one or more clients of the cluster. The compute nodes include hardware resources, such processors, memory and networking, to provide virtualization services in a deployment of the cluster, while the storage nodes include such hardware resources, along with storage, to provide data storage and management services in the cluster. To that end, the storage is requests are directed to data stored on storage devices coupled to one or more of the storage nodes of the cluster. The data served by the storage nodes may be distributed across multiple storage units embodied as persistent storage devices, such as hard disk drives, solid state drives, flash memory systems, or other storage devices.

Configuring the storage and compute nodes as the cluster, e.g., a computer network or subnetwork, may be complicated. A typical subnetwork can have many nodes, any one of which can cause problems if not configured properly. Often, the subnetworks are configured manually, for example, by entering commands at a console in a customer's site, e.g., a data center. Such a process can be cumbersome and error-prone. A misconfigured node can cause serious performance degradation for the node, and for the networked system as a whole. Additionally, it can be difficult to pinpoint the cause of the problem in a subnetwork having many nodes.

In some situations, the storage and compute nodes may be finally tested, assembled, and configured as a subnetwork at a facility of a supplier of the nodes, e.g., a storage vendor. Pre-validation of the network configuration may be performed to determine, inter alia, whether (i) imposed addressing on the nodes is valid, (ii) credible name services are used on the subnetwork, and (ii) virtual local area network (VLAN) tags used for messaging are routable. The pre-validation of network configuration attempts to anticipate an expected, network "end-state" configuration of the nodes without fully modeling the actual end-state configuration as deployed at the customer's data center.

However, in other situations, the nodes are shipped to the customer's data center for "in-field" deployment where network configuration may be imposed by a system administrator of the customer. Often issues arise with such in-field deployment primarily because there are many aspects of the data center that are not controlled by the storage vendor, i.e., the nodes are installed and deployed in an environment having infrastructure equipment, e.g., network infrastructure, that is controlled by the customer. For example, the customer's infrastructure equipment may include intermediate network devices, such as switches and routers, as well as network patch panels and cables that are not owned or controlled by the storage vendor. The storage and compute nodes may be shipped in an un-configured and un-clustered, yet functional state. The system administrator racks, cables and connects the nodes to the infrastructure equipment and then powers the nodes upon deployment as a cluster at the data center. The customer-controlled infrastructure equipment may operate nominally (i.e., as expected) until the storage and compute nodes are deployed, in which case the infrastructure equipment may not be suitably configured to deploy the storage and compute nodes. Moreover, network configuration of the nodes, such as addressing and messaging, by the system administrator may be challenging since failures tend to be transient.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to an optimistic and failsafe technique configured to validate network configurations of storage and compute nodes deployed as a cluster. Illustratively, the nodes are shipped with initial networking parameters for "in-field" deployment at a customer's site, where the nodes are racked, cabled, connected and powered as a cluster of, e.g., a data center. An optimistic aspect of the technique does not pre-validate an expected network configuration (state) of the nodes because initial un-configured and un-clustered, yet functional, "day zero" networking parameters (i.e., an initial "failsafe" network state) are sufficient for initial deployment as the cluster.

An existing network configuration (e.g., the initial network configuration) of each node may be maintained (saved) by the customer (e.g., a system administrator) as the failsafe state and new network configuration parameters may be applied to each node. Illustratively, the new network configuration parameters (i.e., an expected network end-state) are modeled based on configuration parameters provided by the system administrator. A node of the cluster is selected as a coordinating node for changing of the cluster, which organizes and creates a data configuration and addressing model ("data model") representative of the expected network end-state and sends the model to each node, including itself, in the cluster.

According to a validation procedure aspect of the technique, each node employs the data model as a test to validate, inter alia, connectivity with other nodes in the cluster. The validation procedure may occur concurrently (i.e., in parallel) across the nodes of the cluster. For example, each validating node may determine whether a physical cable is connected to an intermediate station, such as an Ethernet switch, of the data center, as well as whether there is a conflict with a network (e.g., Internet Protocol, IP) address that is imposed on a cluster interface port of the node and whether a maximum transfer unit (MTU) size of a frame (e.g., a standard Ethernet frame or a jumbo Ethernet frame) is correctly enabled on the interface. Note that the network configuration validation procedure is performed on the expected network end-state of each validating node to reflect a more accurate test.

The coordinating node may interrogate (e.g., poll) each validating node of the cluster to determine status of the respective validation procedure executing on the validating node. When interrogated by the coordinating node, the validating node may is respond with (i) no response (loss of connectivity; presumed cannot validate); (ii) validating (i.e., validation in-progress); (3) validated: failed (i.e., one or more validation tests failed); and (4) succeeded (i.e., every validation test succeeded/passed). In response to every validating node responding to the coordinating node that the validation test succeeded, the coordinating node sends (broadcasts) an "all-clear" message to all of the nodes (including itself). The all-clear message is an indication that each node has passed the validation test suite, e.g., network connectivity, functioning IP addressing and proper messaging capabilities throughout the entire cluster. The all-clear message also instructs each node to maintain its newly applied expected network end-state (now validated throughout the cluster).

If any node is unreachable, e.g., due to a cable issue, IP address conflict, incorrect MTU size or any other network configuration validation test failure, then a failsafe aspect of the technique is invoked wherein the coordinating node does not send the all-clear message and may cease further status polling or other attempts to communicate with the other nodes. According to this aspect of the technique, when the coordinating node does not send the all-clear message prior to expiration of a predetermined (selected) timeout value, the remaining nodes of the cluster automatically "roll-back" (i.e., revert) to the prior network state (e.g., the initial network state) as failsafe. That is, the act of not sending the all-clear message by the coordinating node as the predetermined timeout value expires causes each node (including the coordinating node) to roll-back (i.e., revert to) and re-impose its prior network state/configuration (e.g., the initial network state). Notably, the technique does not require an affirmative action (e.g., issuance of a not-clear message) by the coordinating node to the other nodes instructing roll-back to the prior network state primarily because there may be a loss of connectivity among one or more nodes in the cluster.

DESCRIPTION

Storage Cluster

Figure 1:
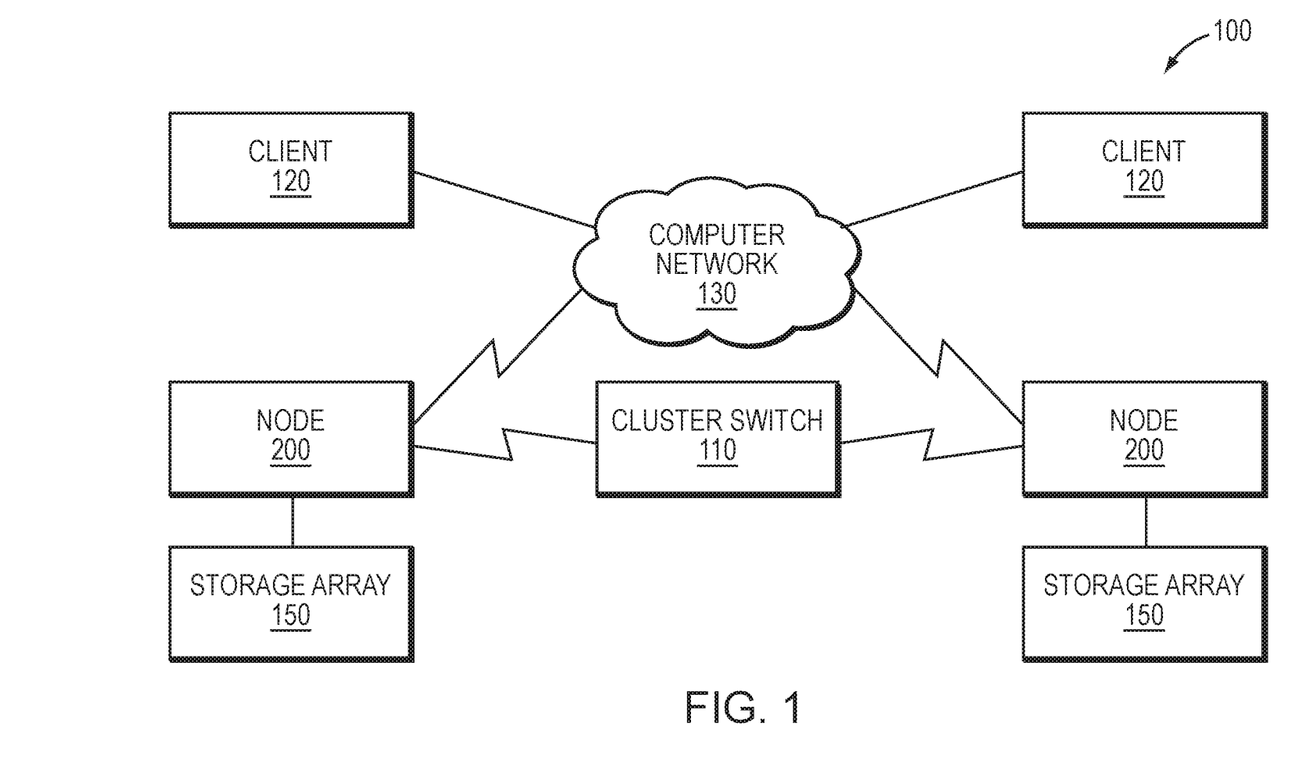
FIG. 1 is a block diagram of a plurality of storage and computer nodes interconnected as a cluster.

FIG. 1 is a block diagram of a plurality of nodes 200, such as storage and compute nodes, interconnected as a cluster 100 and configured to provide various services, such virtualization, storage and management services, for information, i.e., data and metadata, is organized and stored on storage devices of the cluster. The nodes 200 may be interconnected by one or more cluster switches 110 and include functional components that cooperate to provide a distributed, scale-out storage architecture of the cluster 100. The components of each node 200 include hardware and software functionality that enable the node to connect to and service one or more clients 120 over a computer network 130, as well as to a storage array 150 of storage devices, to thereby render the services in accordance with the distributed storage architecture.

Each client 120 may be embodied as a general-purpose computer configured to interact with the node 200 in accordance with a client/server model of information delivery. That is, the client 120 may request the services of the node 200, and the node may return the results of the services requested by the client, by exchanging packets over the network 130. The client may issue packets including file-based access protocols, such as the Network File System (NFS) and Common Internet File System (CIFS) protocols over the Transmission Control Protocol/Internet Protocol (TCP/IP), when accessing information on the node in the form of storage objects, such as files and directories. However, in an embodiment, the client 120 illustratively issues packets including block-based access protocols, such as the Small Computer Systems Interface (SCSI) protocol encapsulated over TCP (iSCSI) and SCSI encapsulated over FC (FCP), when accessing information in the form of storage objects such as logical units (LUNs).

Figure 2:
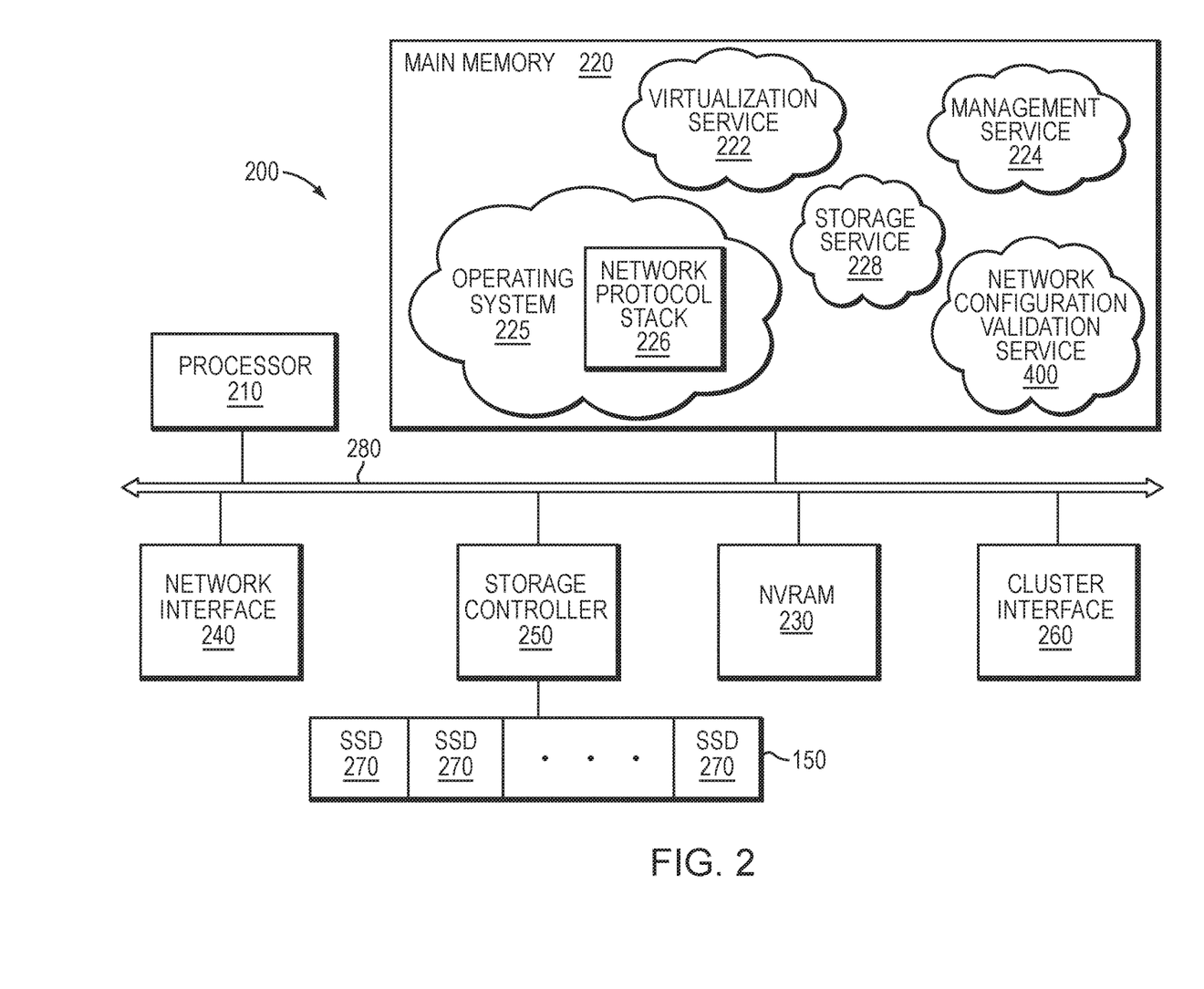
FIG. 2 is a block diagram of a node.

FIG. 2 is a block diagram of a node 200 illustratively embodied as a computer system having one or more processing units (processors) 210, a main memory 220, a non-volatile random access memory (NVRAM) 230, a network interface 240, one or more storage controllers 250 and one or more cluster interfaces 260 interconnected by a system bus 280. The network interface 240 may include one or more ports adapted to couple the node 200 to the client(s) 120 over computer network 130, which may include point-to-point links, wide area networks, virtual private networks implemented over a public network (Internet) or a shared local area network. The network interface 240 thus includes the mechanical, electrical and signaling circuitry needed to connect the node to is the network 130, which may embody an Ethernet or Fibre Channel (FC) network.

The main memory 220 may include memory locations that are addressable by the processor 210 for storing software programs and data structures associated with the embodiments described herein. The processor 210 may, in turn, include processing elements and/or logic circuitry configured to execute the software programs, such as virtualization service 222, data management service 224, and storage service 226, and manipulate the data structures. An operating system 225, portions of which are typically resident in memory 220 (in-core) and executed by the processing elements (e.g., processor 210), functionally organizes the node by, inter alia, invoking operations in support of the services implemented by the node. The operating system 225 includes a network protocol stack 226 for exchanging messages and/or other network traffic over the cluster and computer network. A suitable operating system 225 may include a general-purpose operating system, such as the UNIX® series or Microsoft Windows® series of operating systems, or an operating system with configurable functionality such as microkernels and embedded kernels. However, in an embodiment described herein, the operating system is illustratively a version of the Linux® operating system. It will be apparent to those skilled in the art that other processing and memory means, including various computer readable media, may be used to store and execute program instructions pertaining to the embodiments herein.

The storage controller 250 cooperates with the services implemented on the node 200 to access information requested by the client 120. The information is preferably stored on storage devices such as solid state drives (SSDs) 270, illustratively embodied as flash storage devices, of storage array 150. In an embodiment, the flash storage devices may be block-oriented devices (i.e., drives accessed as blocks) based on NAND flash components, e.g., single-layer-cell (SLC) flash, multi-layer-cell (MLC) flash or triple-layer-cell (TLC) flash, although it will be understood to those skilled in the art that other block-oriented, non-volatile, solid-state electronic devices (e.g., drives based on storage class memory components) may be advantageously used with the embodiments described herein. The storage controller 250 may include one or more ports having I/O interface circuitry that couples to the SSDs 270 over an I/O interconnect arrangement, such as a is conventional serial attached SCSI (SAS), serial ATA (SATA) topology, and Peripheral Component Interconnect (PCI) express.

Each cluster interface 260 may include one or more ports adapted to couple the node 200 to the other node(s) of the cluster 100. In an embodiment, a plurality of Ethernet ports (e.g., 10 Gbps) may be used for internode communication, although it will be apparent to those skilled in the art that other types of protocols and interconnects may be utilized within the embodiments described herein. The NVRAM 230 may include a back-up battery or other built-in last-state retention capability (e.g., non-volatile semiconductor memory such as storage class memory) that is capable of maintaining data in light of a failure to the node and cluster environment.

In an embodiment, the compute nodes are physically and logically different from the storage nodes. For example, the compute nodes illustratively include hardware resources, such processors, memory and networking, that cooperate to provide the virtualization service 222, while the storage nodes include those hardware resources as well as storage that cooperate to provide the data management service 224 and storage service 228. In addition, the compute nodes may execute software processes (such as ESX hypervisors) to provide the virtualization service 222, whereas the storage nodes may execute a variant of the operating system 225 (e.g., a storage operating system) to provide the storage and management services. Moreover, storage of the compute nodes may be apportioned into two physical partitions, a first partition which runs the storage operating system (OS) and a second partition which runs the virtualization processes. Illustratively, the storage OS partition of the compute node controls an initialization (boot) process that enables participation in an optimistic and failsafe technique for validation of a network configuration described herein and, if successful, a one-time reboot is performed into the virtualization partition.

Notably, each node implements a network configuration validation service 400 for implementing the optimistic and failsafe validation technique. Illustratively, the network configuration validation service 400 includes a server instance and a client instance, e.g., of a Representational State Transfer (REST) network application, which is implements a stateless client-server communications protocol (e.g., HTTP) and provide REST APIs. The validation service 400 includes a test suite to validate a network configuration for each node. The coordinating node is initialized with the server instance and communicates with the client instances of each node (including itself) in the cluster when implementing the validation technique.

Optimistic and Failsafe Network Configuration

The embodiments described herein are directed to the optimistic and failsafe technique configured to validate network configurations of storage and compute nodes deployed as a cluster. The nodes may be shipped with initial networking parameters for "in-field" deployment at a customer's site, where the nodes are racked, cabled, connected and powered as a cluster of, e.g., a data center, initially as a "day 0" cluster deployment, but also capable of a scale-out cluster deployment. Illustratively, network configuration of the nodes as the cluster may include one or more subnetworks, which configuration is orchestrated from one of the storage nodes (i.e., a coordinating node).

Figure 3:
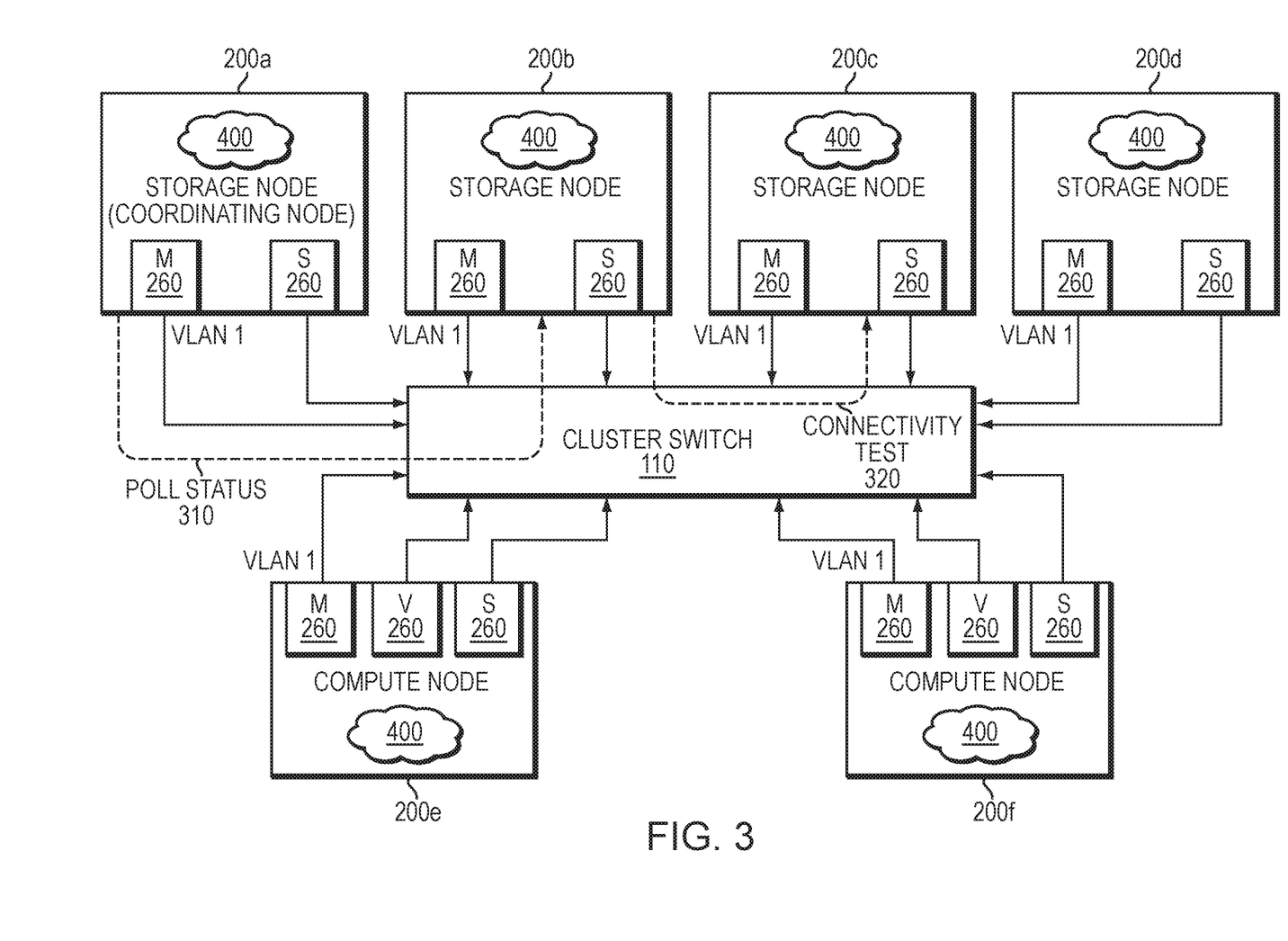
FIG. 3 is a block diagram of an example cluster deployment.

FIG. 3 is a block diagram of an example cluster deployment having a cluster configuration size of four (4) storage nodes (200a-d) and two (2) compute nodes (200e-f). It should be noted, however, the technique described herein may apply to only a storage node cluster configuration. Although the nodes may be initially configured with dynamically assigned network, e.g., internet protocol (IP), addresses without guarantee of cluster-wide reachability, at least one of the storage nodes (i.e., the coordinating node) is assigned a cluster-wide routable IP address to ensure network connectivity and to enable orchestration of the validation technique. A storage node is preferably selected as the coordinating node because, unlike a compute node which transitions to implementing the virtualization processes and which may have varying operating systems and network stacks, the storage OS (and, in particular, its network protocol stack 226) version is consistent (i.e., has repeatable behavior) throughout the validation procedure.

In an embodiment, there are at least two logical network (cluster interface) ports 260 on each node, with the exception of the compute nodes, which have three such ports. The first (S) and second (M) ports 260 of each node cooperate to provide storage and management subnetworks among the storage and compute nodes of the cluster. Note that the storage and management subnetworks may be provided using VLAN segregation. The third (V) ports 260 of the compute nodes cooperate to provide a separate subnetwork among the compute nodes that is dedicated to migrating virtual machines (VMs), e.g., via a vMotion feature of the virtualization service 222, for load balancing and high availability failover. Note that the separate "vMotion" subnetwork is utilized because migration of VMs and failover operations consume substantial bandwidth, which would severely impact the storage and management subnetworks. Note also that both the compute and storage nodes run a shared file system (hosted on shared storage) so that each node can access the VMs on the cluster.

An optimistic aspect of the network validation technique does not pre-validate an expected (i.e., new or subsequent) network configuration (state) of the nodes, primarily because pre-validating an expected network state is often unreliable due a lack of foreseeably in predicting network behavior of the cluster when the expected network state is actually invoked cluster-wide largely due to an inability to isolate behavior of existing network routing. That is, often an existing network configuration masks reachability (i.e., routing in the cluster) for an expected network configuration, because the existing network reachability cannot be isolated from an expected network configuration, especially when subnetworks are added to existing networks to model the expected network configuration. As such, it is assumed "optimistically" that the expected network state is correct and subject to validation once invoked; otherwise the network state may revert (i.e., "roll-back") to the existing network state as a "failsafe." Notably, initial un-configured and un-clustered, yet functional, "day zero" networking parameters (i.e., an initial "failsafe" network state) are sufficient for initial deployment as the cluster. Illustratively, the initial networking parameters utilize Internet Assigned Numbers Authority (IANA) private-use networks, such as 192.168.0.0/16.

An existing network configuration (e.g., the initial network configuration) of each node may be maintained (saved) by the customer (e.g., a system administrator) as a "failsafe" state and new, expected network configuration parameters may be applied to is each node. Illustratively, the new network configuration parameters (i.e., an expected network end-state) are modeled based on configuration parameters provided by the system administrator. In an embodiment, each node includes a network configuration file (i.e., a persistent configuration) that is imposed on startup of the respective node. Notably, each node also has a transient network configuration during imposition of the respective network configuration that may not match the network configuration. That is, while a network configuration is being performed (i.e., imposed) the network may undergo changes (i.e., is in transition from one state to another) until the network configuration is imposed, i.e., network changes are fully achieved as an end-state.

In an embodiment, the system administrator provides input networking (addressing) configuration parameters of the expected network end-state via a user interface (UI), illustratively implemented as one or more Wizard UI screens, of the coordinating node. Examples of such addressing configuration parameters include management IP, subnetwork, and gateway addresses for the ports of the storage, management, and vMotion networks. The user interface also performs some limited pre-validation of the input parameters to identify any apparent problems issues or failures as soon as possible. The coordinating storage node then organizes and creates a data configuration and addressing model ("data model") representative of the expected network end-state and sends (communicates) the model to each node, including itself, in the cluster. Illustratively, the data model is an array of all nodes and their networking parameters. The server instance on the coordinating storage node effects such communication to instruct all of the client instances on the nodes to impose a respective network configuration via the REST APIs that specify the eventual, terminal network end-states of the nodes within the subnetworks.

Upon reception of the data model, each storage/compute node first saves a copy of its initial network state for roll-back (i.e., reversion) in accordance with the technique prior to identifying itself (e.g., via a serial number) in the model so that it can reconfigure its networking parameters, including addressing, to comply with the model. Illustratively, the network configuration file (e.g., "config.network") is saved (e.g., copied to a file "config.bak") followed by imposing the expected network configuration is to adopt the new network parameters. According to a validation procedure aspect of the technique, each node employs the data model as a test to validate, inter alia, connectivity (e.g., connectivity test 320) with other nodes in the cluster. The validation procedure may occur concurrently (i.e., in parallel) across the nodes of the cluster. For example, each validating node may determine whether a physical cable is connected to an intermediate station, such as the cluster switch 110, of the data center, as well as whether there is a conflict with a network (e.g., Internet Protocol, IP) address that is imposed on an cluster interface port of the node and whether a maximum transfer unit (MTU) frame size (e.g., of a standard Ethernet frame or a jumbo Ethernet frame) is correctly enabled on the interface. Note that the network configuration validation procedure is performed on the expected network end-state of each validating node to reflect a more accurate test.

Specifically, each validating node tests (validates) itself with respect to the reconfigured networking parameters of the expected network end-state and as against every other node listed in the data model. Each node attempts to validate every port on every node in parallel over the subnetworks, so as to respond to status queries from the coordinating node and transition to the expected network end-state upon receiving the all-clear message prior to expiration of a predetermined timeout value. Selection of the timeout value may be based on preference for a false negative (erroneously roll-back when the expected network configuration is valid) over a false positive (erroneously conclude the expected network configuration is valid), which obviates a situation where the nodes transition to the expected network end-state configuration that is assumed good when, in fact, it is not. To that end, the selected timeout value of a primary timeout window is illustratively reflective of a value that is satisfactory in view of the parallel (i.e., concurrent) distribution of the data model across the nodes of the cluster (e.g., a timeout value of 120 secs). In an embodiment, the selected timeout value may be more aggressive (shorter) than the satisfactory value to ensure that if the primary timeout window expires before response are received from all validating nodes at the coordinating node, then indications of failed validation tests by the nodes and resulting declarations of "failed network" are reliable.

Notably, the primary timeout window for response by each node to the is coordinating node is consistent regardless of the scale (size) of the cluster, which is a key aspect of the technique for optimistic and failsafe validation in a distributed, scale-out storage architecture. That is, the expected network end-state validation of the nodes is intentionally performed in parallel (concurrently) such that a constant timeout value exists over any scale-out of the cluster. Therefore, the timeout value of the primary timeout window specified to validate a network configuration for a 100 node cluster is the same as that for a smaller, 10 node cluster. This is possible because the validation technique essentially involves input/output (I/O) bound operations that execute in parallel across the nodes and that do not substantially impact processing resources of nodes. That is, the validation technique is I/O bound not compute bound. Moreover, every validating node utilizes its own thread (as opposed to a thread pool) to enable creation of the reasonable timeout value irrespective of the cluster node size deployed or performance of the processor of the node. Accordingly, the timeout value/window selection of the validation technique is based on network characteristics rather than node characteristics. This implicates the amount of connectivity and performance of a subnetwork, i.e., a 10 GB Ethernet subnetwork may have a different timeout value than that of a 1 GB Ethernet subnetwork. The timeout window/value is selected to also avoid situations where, although network connectivity may be validated, performance of the network is so slow (i.e., throughput and/or latency are deficient) that the expected network configuration effectively does not operate properly. It is desirable to avoid having nodes come up in such an environment.

In an embodiment, the validation procedure includes networking checks, such as ping and network protocol stack checks, although responses to API calls may be sufficient to ensure connectivity for the management ports. In order to achieve fine-grained and actionable network diagnostics, network protocol stack validation may be based on the OSI model to enable testing of the various layers of the stack 226. For example, a first check may be at the physical layer of the OSI model to ensure whether the physical cable is plugged in correctly. A data link layer check may include virtual local area network (VLAN) validation, as well as duplicate MAC address and MTU size (jumbo frame) validations. A network layer check may include duplicate IP address validation, as well as ICMP ping, whereas a layer 4 protocol check may be directed to iSCSI and HTTP accesses. Finally, an application layer test may include API calls. Validation of such networking checks provide a strong confidence level (indication) that the expected network end-state works correctly. However, a failure to pass any of the tests may also provide specific, actionable information (e.g., a test log) about how and when the validation check failed and, importantly, may be used to facilitate repair. The test log may be sent the coordinating node for review by the administrator.

As each node proceeds with its validation, the coordinating node may interrogate (e.g., poll) each validating node, e.g., over the management subnetwork of the cluster to determine status (e.g., poll status 310) of the respective validation procedure executing on the validating node. When interrogated by the coordinating node, the validating node may respond with (i) no response (loss of connectivity; presumed cannot validate); (ii) validating (validation in-progress); (3) validated: failed (one or more validation tests failed); and (4) succeeded (all validation tests succeeded/passed). In response to every validating node responding to the coordinating node that the validation test succeeded, the coordinating node sends (broadcasts) an "all-clear" message to all of the nodes (including itself). The all-clear message is an indication that each node has passed the validation test suites, e.g., network connectivity, functioning IP addressing and proper messaging capabilities throughout the entire cluster. The all-clear message also instructs each node to maintain its newly applied expected network end-state (now validated throughout the cluster). In an embodiment, the "failsafe" is implemented as an automatic roll-back by swapping the network configuration file ("config.network") with the saved network configuration file (e.g., "config.network" and "config.bak" are swapped) so that the save network configuration file once again becomes the network configuration file (i.e., the persistent configuration) imposed at startup. As a result, should a power failure occur during validation, each node would automatically reboot to using the prior configuration as a failsafe (i.e., the save configuration swapped into the "config.network" file). If the all-clear message is received at the node, then the configuration files are swapped again, e.g., "config.network" and "config.bak" are swapped back, so that the expected network configuration becomes the persistent configuration imposed at startup. If the all-clear message is not received, the network may be "rolled-back" (i.e., reconfigured back to the prior network state indicated in the "config.bak" file).

Preferably, the coordinating node sends the "all-clear" message prior to expiration of the timeout value. To avoid a race condition, i.e., where some nodes receive the "all-clear" message and some do not within the primary timeout window, a secondary timeout window (or even an extension of the primary timeout window) may be established to ensure reception of the "all-clear" message by the nodes. Here, the secondary timeout window may extend the primary timeout window by a predetermined timeout value, such as approximately 100 seconds, before validation is considered a failed operation.

If any node is unreachable, e.g., due to a cable issue, IP address conflict, incorrect MTU size or any other network configuration validation test failure, then a failsafe aspect of the technique is invoked. In other words, absent the all-clear message broadcast to the nodes of the cluster, the failsafe aspect of the technique is invoked wherein the coordinating node does not send the all-clear message and may otherwise cease further status polling or further attempts to communicate with the other nodes. The act of not sending the all-clear message by the coordinating node as the primary timeout window expires causes each node (including the coordinating node) to roll-back (i.e., revert to) and re-impose its prior network state/configuration (e.g., the initial network state). Notably, the technique does not require an affirmative action (e.g., issuance of a not-clear message) by the coordinating node to the other nodes instructing roll-back to the prior network state primarily because there may be a loss of connectivity among one or more nodes in the cluster. The test log from the failed tests of the nodes may be sent to the coordinating node and an investigation may then be performed by the system administrator and/or storage vendor to determine the type and cause of failure. According to the technique, such investigation may be based on the fine-grained and actionable failure data reflective of the testing performed during validation. That is, based on testing of the entire network protocol stack 226, any failure can be fine-grained reportable in most cases. If connectivity is lost, of course, this is important actionable failure data also.

Figure 4:
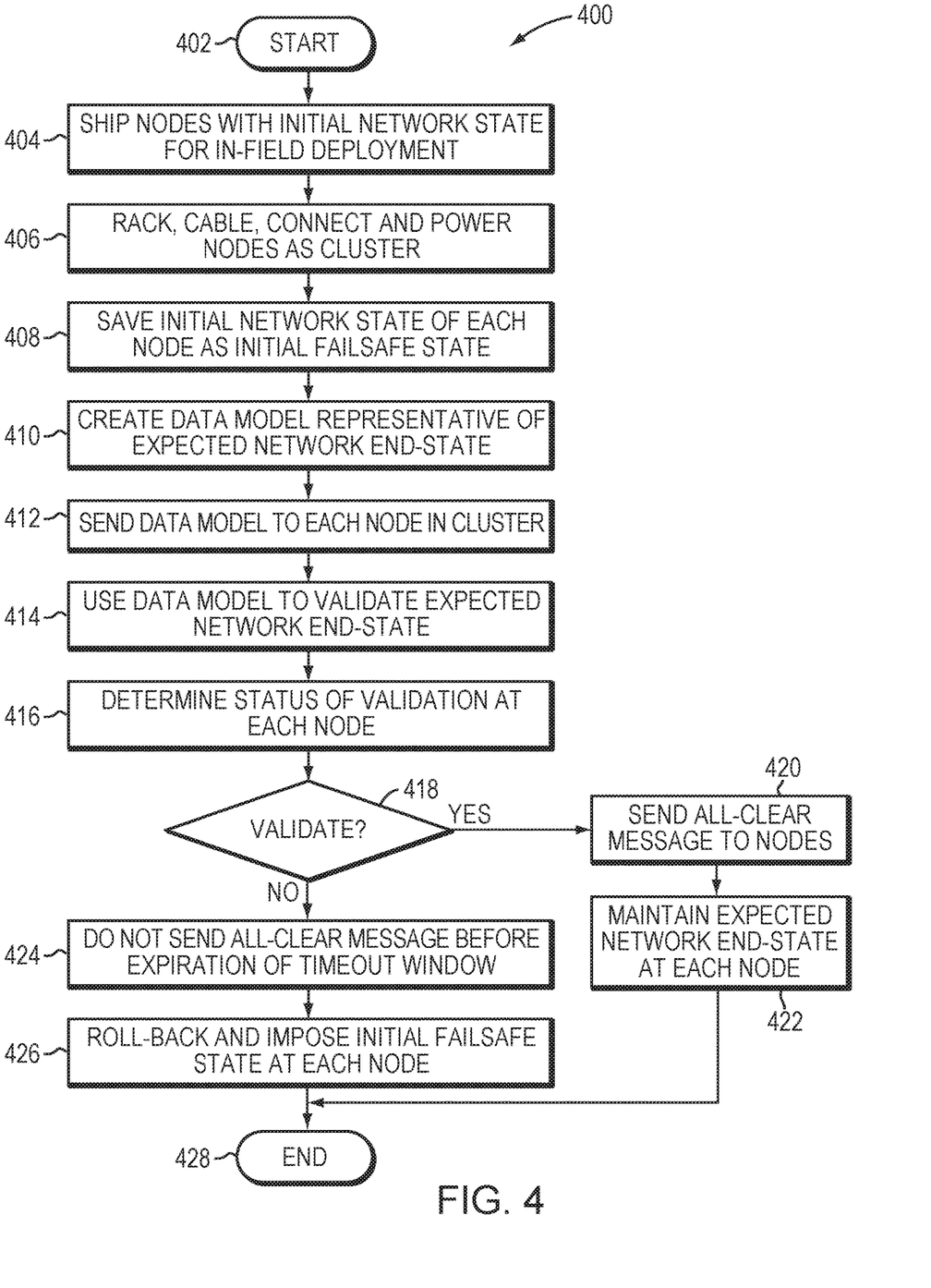
FIG. 4 is a flowchart of example simplified procedure for performing an optimistic and failsafe technique for validating network configurations of the storage and computer nodes of the cluster.

FIG. 4 is a flowchart of example simplified procedure, as illustratively is implemented by the network configuration validation service 400, for performing an optimistic and failsafe technique for validating network configurations of storage and computer nodes of a cluster. The procedure starts at box 402 and proceeds to box 404 where the nodes are shipped with initial networking parameters (i.e., an initial network state) for "in-field" deployment, e.g., at a customer's site. At box 406, the nodes are racked, cabled, connected and powered as a cluster of, e.g., a data center. An expected network configuration (state) of the nodes is not pre-validated, primarily because the un-configured and un-clustered, yet functional, "day zero" initial network state is sufficient for initial deployment as the cluster. Instead, at box 408, the initial network configuration state of each node is maintained (saved) by the customer (e.g., a system administrator) as a "failsafe" state and new network configuration parameters (i.e., an expected network end-state) are applied to each node. The expected network end-state is modeled based on configuration parameters provided by the system administrator. At box 410, a coordinating node of the cluster then organizes and creates a data model representative of the expected network end-state and, at box 412, sends the model to each node, including itself, in the cluster.

At box 414, each node employs (uses) the data model as a test to validate expected network end-state including, inter alia, network connectivity with other nodes in the cluster. At box 416, the status of the validation procedure is determined by, e.g., interrogating each validating node of the cluster. In response to every validating node responding, e.g., to the coordinating node, that the validation test succeeded (decision box 418), the coordinating node sends an "all-clear" message to all of the nodes (including itself) at box 420. The all-clear message is an indication that each node has validated the expected network end-state parameters and configuration, including network connectivity, functioning IP addressing and proper messaging capabilities throughout the entire cluster. The all-clear message also instructs each node to maintain its newly applied expected network end-state at box 422. The procedure ends at box 428.

However, if any node does not respond with affirmative validation at decision box 418, due to, e.g., a cable issue, IP address conflict, incorrect MTU size or any other is network configuration validation test failure, then the coordinating storage node does not send the all-clear message to the other nodes. That is, the coordinating node does not send the all-clear message before expiration of a predetermined timeout value of a timeout window (box 424) and, as a result, the remaining nodes of the cluster "roll-back" (i.e., revert to)

and impose the prior network state (e.g., the initial failsafe network state) at box 426. Notably, the technique does not require an affirmative action (e.g., issuance of a not-clear message) by the coordinating node to the other nodes instructing roll-back to the, e.g., initial network failsafe state, primarily because there may be a loss of connectivity among one or more nodes in the cluster. The procedure then ends at box 428.

Advantageously, aspects of the optimistic and failsafe network validation technique described herein include orchestrating connectivity of nodes in an entire cluster (subnetwork) environment in parallel (i.e., at once) rather than a simple one-to-one network connection validation to improve efficiency. In addition, if a node fails validation, a specific diagnostic response (e.g., the test log) may be provided indicating a reason for failure to facilitate repair of the cluster. Another aspect includes automatic rollback to the prior network configuration state based on expiration of a timer (a timeout window) rather than an assertion by the coordinating node, which itself may fail. In sum, the technique provides a network-centered approach to network configuration validation in a distributed scale-out storage architecture environment (i.e., independent of a number of nodes in the cluster) to achieve stable, consistent network configuration of nodes even if communication/connectivity is lost.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the is scope of the embodiments herein. Therefore, it is the object of the appended claims to cover all such variations and modifications as come within the true spirit and scope of the embodiments herein.

What is claimed is:

1. A method comprising:
    modeling an expected network configuration for storage and compute nodes of a cluster;
    selecting a coordinating node from the storage nodes having a network address reachable from all the nodes of the cluster;
    deploying the expected network configuration to the nodes, each node having a prior network configuration;
    validating the deployed expected network configuration at each node of the cluster;
    polling status of the validation at each node from the coordinating node; and
    in response to an indication by a first node of the cluster polled by the coordinating node that the status of validation at the first node failed,
        reverting to the prior network configuration, wherein the prior network configuration is a failsafe initial network configuration based on Internet Assigned Number Authority (IANA) private-use network addresses.

2. The method of claim 1 further comprising
    sending an all-clear message from the coordinating node to all of the nodes in response to each node of the cluster responding to the coordinating node within a primary timeout window.

3. The method of claim 2 further comprising
    maintaining the deployed expected network configuration at each node in response to receiving the all-clear message.

4. The method of claim 2 further comprising:
    extending the primary timeout window by an additional timeout window.

5. The method of claim 1 wherein validating the deployed expected network configuration at each node further comprises executing a validation suite to verify routing of messages from the respective node within the cluster according to the expected network configuration.

6. The method of claim 5 wherein the validation suite is based on a stateless client-server protocol to verify the routing of messages.

7. The method of claim 1 wherein validating the deployed expected network configuration executes concurrently across the cluster within a primary timeout window independent of a number of nodes in the cluster.

8. The method of claim 1 further comprising:
    in response to the first node of the cluster polled by the coordinating node that the status of validation at the respective node is still validating, polling the status of the validation at the first node again by the coordinating node until an expiration of a primary timeout window.

9. The method of claim 1 wherein the polling of the status of the validation by the coordinating node at each node occurs via a management subnetwork.

10. The method of claim 1 wherein the expected network configuration is pre-validated by determining whether (i) imposed addressing on the nodes is valid, (ii) credible name services are used on subnetworks of the cluster, and (iii) VLAN tags used for messaging in the cluster are routable.

11. The method of claim 1 further comprising
    modeling the expected network configuration based on administrator specified configuration parameters.

12. A system comprising:
    a cluster of storage and computer nodes connected by a cluster switch, each node having a plurality of network interfaces coupled to a processor executing program instructions configured to:
        model an expected network configuration for the nodes;
        select a coordinating node from the storage nodes having a network address reachable from all the nodes of the cluster;
        deploy the expected network configuration to the nodes, each node having a prior network configuration;
        validate the deployed expected network configuration at each node of the cluster;
        poll a status of the validation at each node from the coordinating node; and
        in response to an indication by a first node of the cluster polled by the coordinating node that the status of validation at the first node failed,
            revert to the prior network configuration, wherein the prior network configuration is a failsafe initial network configuration based on Internet Assigned Number Authority (IANA) private-use network addresses.

13. The system of claim 12 wherein the program instructions configured to validate the deployed expected network at each node further comprises program instructions configured to execute a validation suite to verify routing of messages from the respective node within the cluster according to the expected network configuration.

14. The system of claim 13 wherein the validation suite is based on a stateless client-server protocol to verify the routing of messages.

15. The system of claim 12 wherein the program instructions configured to validate the deployed expected network configuration are further configured to execute concurrently across the cluster within a primary timeout window independent of a number of nodes in the cluster.

16. The system of claim 12 wherein the program instructions are further configured to:
in response to the first node of the cluster polled by the coordinating node that the status of validation at the respective node is still validating, poll the status of the validation at the first node again by the coordinating node until an expiration of a primary timeout.

17. The system of claim 12 wherein the expected network configuration is pre-validated by determining whether (i) imposed addressing on the nodes is valid, (ii) credible name services are used on subnetworks of the cluster, and (iii) VLAN tags used for messaging in the cluster are routable.

18. A non-transitory computer readable medium containing executable program instructions for execution by a processor of a node in a cluster of storage and compute node, comprising:
model an expected network configuration for the cluster of nodes;
select a coordinating node from the storage nodes having a network address reachable from all the nodes of the cluster;
deploy the expected network configuration to the nodes, each node having a prior network configuration;
validate the deployed expected network configuration at each node of the cluster;
poll a status of the validation at each node from the coordinating node; and
in response to an indication by a first node of the cluster polled by the coordinating node that the status of validation at the first node failed,
revert to the prior network configuration, wherein the prior network configuration is a failsafe initial network configuration based on Internet Assigned Number Authority (IANA) private- use network addresses.

* * * * *